(12) United States Patent
Lemanski et al.

(10) Patent No.: US 6,735,309 B1
(45) Date of Patent: May 11, 2004

(54) ANTI-REVERSAL END CAP FOR UNIVERSAL PASSENGER CONTROL UNIT

(75) Inventors: Gregory R. Lemanski, Alta Loma, CA (US); David M. Whitmer, Chino Hills, CA (US); Joel D. Royer, Fullerton, CA (US)

(73) Assignee: Rockwell Collins, Cedar Rapids, IA (US)

( * ) Notice: Subject to any disclaimer, the term of this patent is extended or adjusted under 35 U.S.C. 154(b) by 407 days.

(21) Appl. No.: 09/847,835

(22) Filed: May 2, 2001

(51) Int. Cl.[7] ............................................... H04M 1/00
(52) U.S. Cl. ........................ 379/454; 379/446; 379/438
(58) Field of Search ................................. 379/438, 446, 379/455, 454

(56) References Cited

U.S. PATENT DOCUMENTS 4,647,726 A * 3/1987 Blum .......................... 379/438
5,394,467 A * 2/1995 Kepley, III et al. ......... 379/438
5,410,597 A * 4/1995 Kepley, III et al. ......... 379/446

* cited by examiner

*Primary Examiner*—Jack Chiang
(74) *Attorney, Agent, or Firm*—Nathan O. Jensen; Kyle Eppele

(57) ABSTRACT

An anti-reversal end cap with tab to prevent improper stowage of a handset into its cradle. The end cap is formed by joining two members together to route a cable from an in-flight entertainment system to the handset. The end cap has a protruding tab which interferes with the cradle if the handset is improperly stowed. The end cap can be taken apart to free the cable from the handset such that the cable does not need to be re-terminated. The tab on the end cap has a generally wedged shape to prevent binding with the cradle and to ensure smooth ejection.

12 Claims, 5 Drawing Sheets

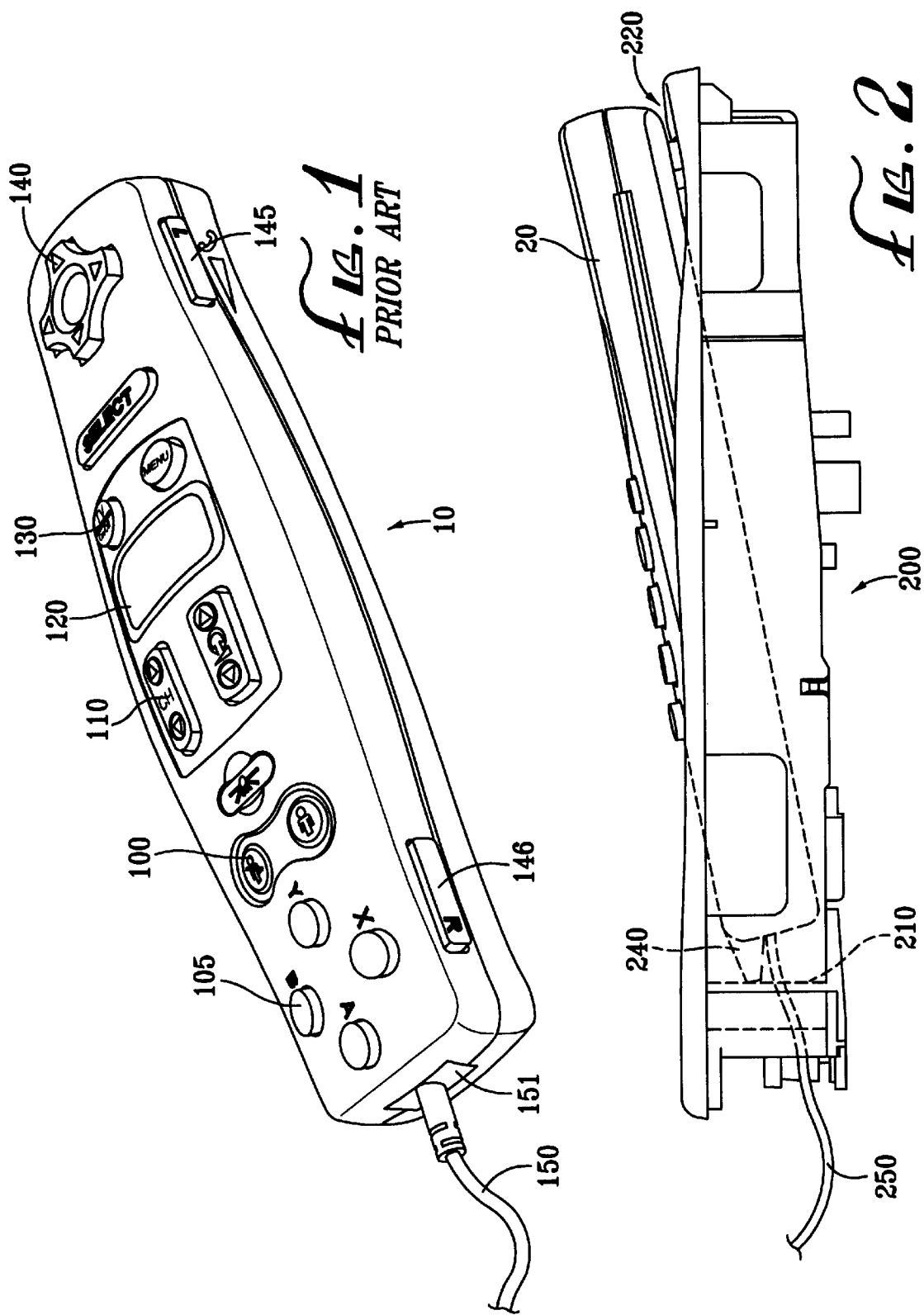

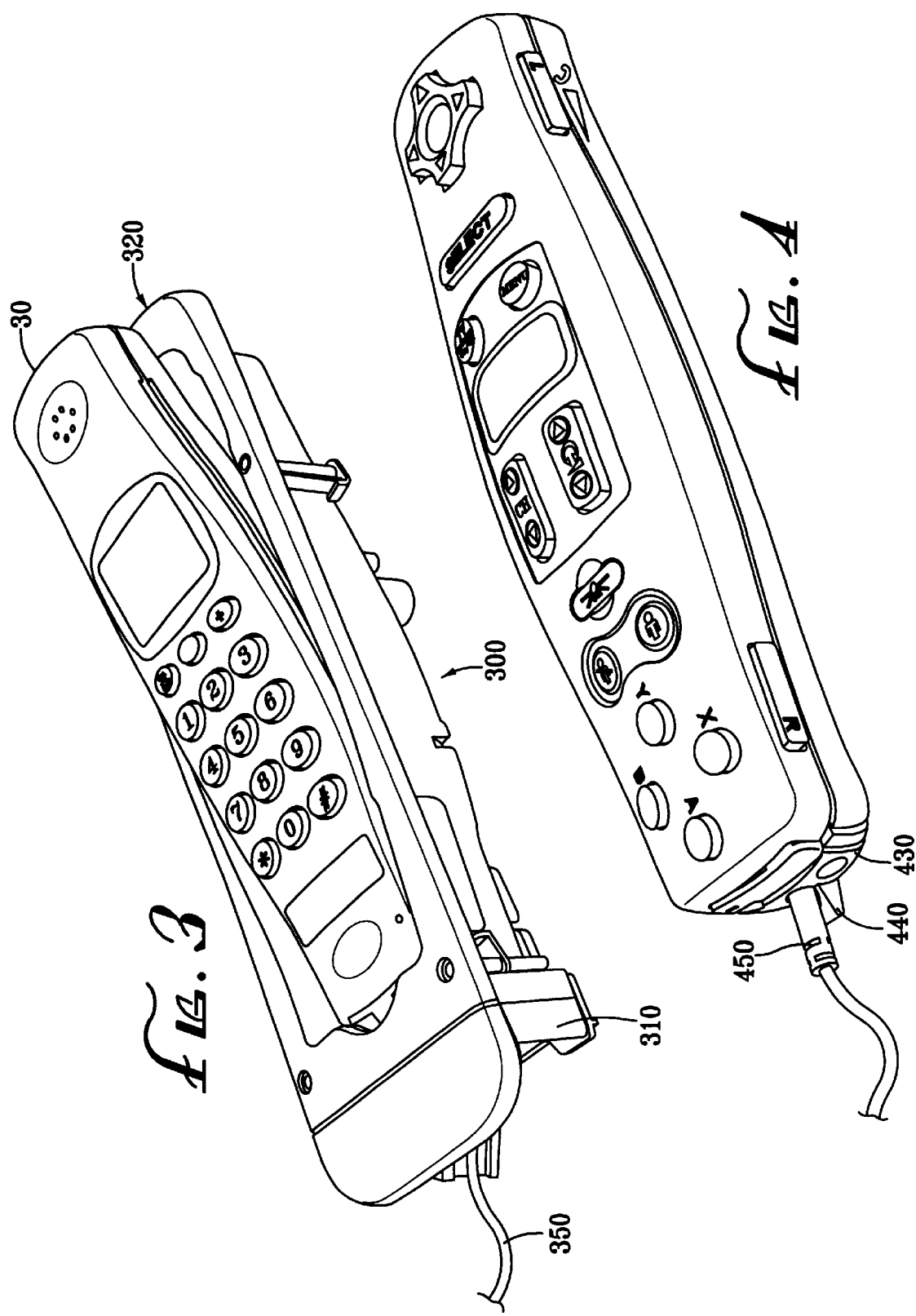

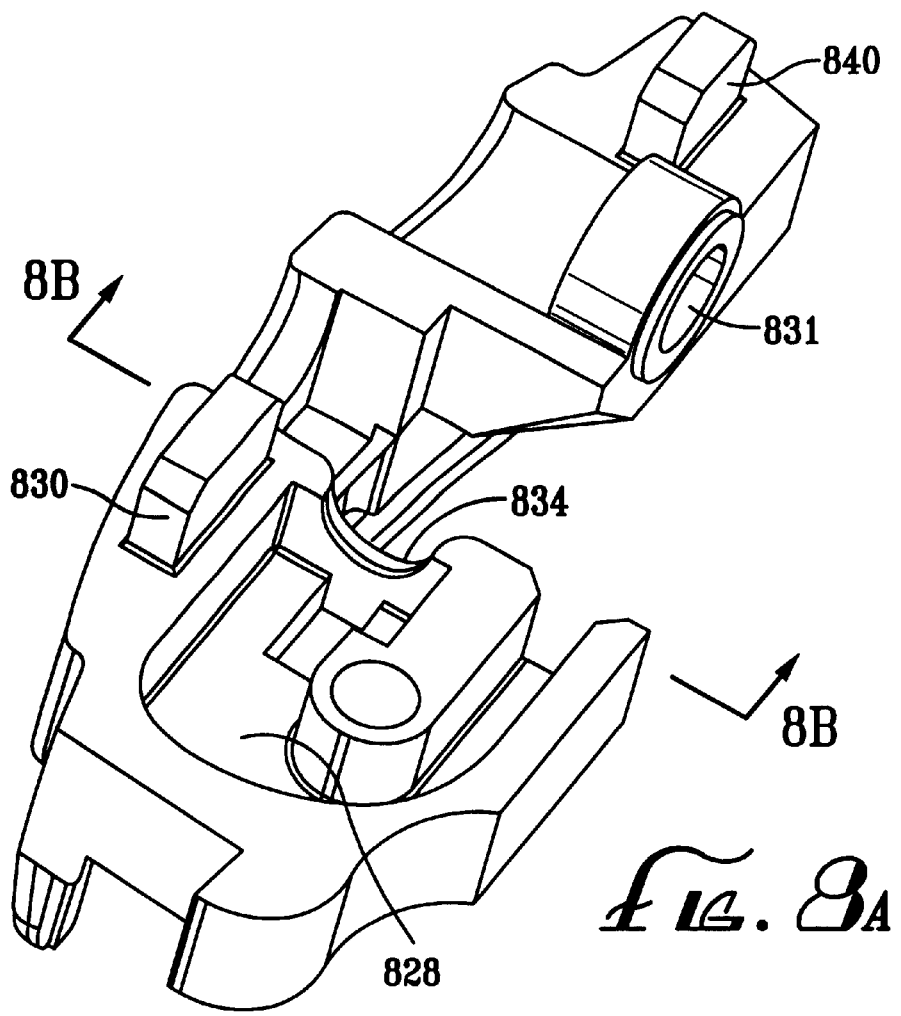
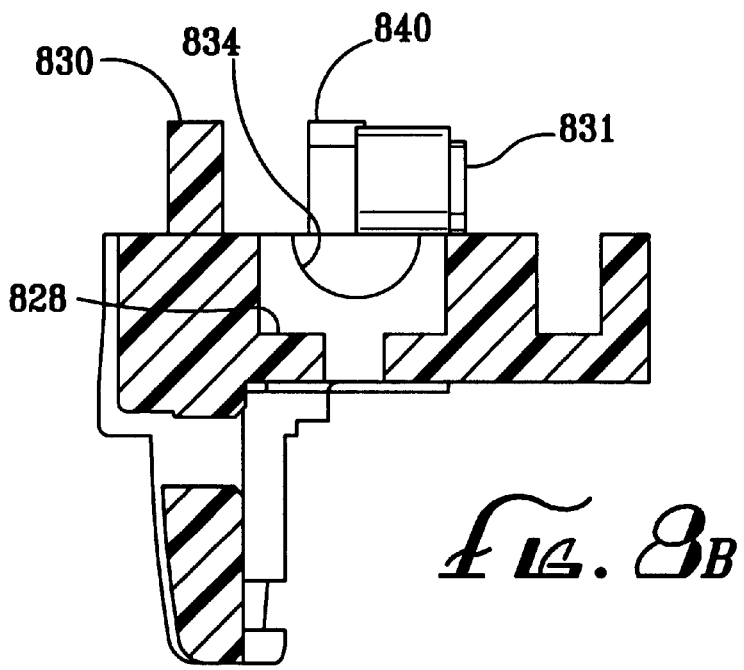

ANTI-REVERSAL END CAP FOR UNIVERSAL PASSENGER CONTROL UNIT

FIELD OF THE INVENTION

The present invention relates to in-flight entertainment systems ("IFE") provided by passenger aircrafts, and more particularly relates to the universal controller handsets used by passengers to interact with the in-flight entertainment systems.

ART BACKGROUND

With the advent of technology, traveling on passenger aircrafts has become quite some experience. Each passenger's seat not only offers an individual screen for movie viewing, it also allows the passenger to play interactive video games, or browse the in-flight duty-free shop, by using a controller handset. Pretty soon, passengers will be able to surf the worldwide web during flight. As people become more connected on the ground, some airlines have gone as far as installing individual telephone handsets at each passenger's seat, so that business can still be conducted at 30,000 feet above ground. Not to be mistaken, airlines offer these amenities to increase customer satisfaction, as well as their own revenue derived from goods sold and in-flight telephone calls made.

With all these electronics and communications options available to a passenger at her fingertips, it would have been unthinkable to have multiple gadgets and wiring for the passenger to manipulate at her seat. A universal passenger control unit ("UPCU") is thus developed to integrate all the passenger's electronics and communications controls into one handset. A typical model of such universal handset has been provided to numerous airlines by Passenger Systems division of Rockwell Collins, Inc., the assignee of the present application, as shown in FIG. 1.

As shown in FIG. 1, handset 10 is constructed to provide multiple control functions such as video game control 105, 140, 145, 146, audiovisual programming 130, channel and volume adjustment buttons 110, status screen 120 and of course attendance call/cancel buttons 100. In additional to providing control functionality, the flip side of handset 10 (not shown) is constructed to operate as a telephone handset.

When not in use, handset 10 is stowed in a cradle (illustrated in FIGS. 2 and 3), which is typically installed in the seat arm, on top or on the side. The normal position is to stow handset 10 with its controller side facing up. This way, passengers can still use handset 10 to control the audiovisual programming, change channels or stations, turn the overhead reading light on or off, or call the attendant, with handset 10 remaining in its cradle.

Handset 10 can also be removed from the cradle for the passenger to additionally play video games, browse the worldwide web or use the telephone features on the other side of handset 10. When the passenger is finished with handset 10, handset 10 can be stowed back into the cradle, hopefully with its controller side up. Cable 150 is also automatically retracted by a cord reel (not shown) attached to the cradle. The generally symmetrical shape of handset 10 and its universality make it very convenient to use and to handle, in addition to giving it an attractive look and feel.

Cable 150 links, through a retractable cord reel (not shown), the handset's control and telephone functionality to a server or switch located away from the armrest. When cable 150 is first installed with handset 10, cable 150 is drawn from the cord reel and led through a removable end cap 151, before its termination with a connector. The connector can then be plugged into a circuit board socket within handset 10. End cap 151, which serves as the mechanical interface between cable 150 and the cord reel, can then be securely attached to handset 10 by a temper-proof screw to prevent electromagnetic interference ("EMI"), electrostatic discharge ("ESD") and environmental hazards from affecting handset 10. As is commonly the practice, end cap 151 makes it possible to repair or replace handset 10, when it needs servicing. All the field crew needs to do is to unscrew end cap 151, unplug the cable connector and handset 10 can be removed.

There are some drawbacks associated with the generally symmetrical shape and universality of handset 10. The symmetry makes it more likely that a passenger will stow the handset back to its cradle with the controller side facing down, thus preventing the passenger from using the controlling functions later on. Sometimes, the handsets are improperly stowed and they end up being stuck in the cradle.

To facilitate proper stowage of the handset and to preserve the symmetrical look and feel, the cradle and handset assembly has been designed to achieve better fit when it has the proper face up, while making the fit more awkward and resistant, if the handset has the wrong face face up. However, because the handset is generally symmetrical, a passenger is not likely to notice the feel of friction, or resistive awkwardness, when the handset is improperly inserted. In fact, airlines have found that many passengers simply push and shove harder to get the handset into the cradle, being totally unaware of the difference. Many handsets have been found to suffer damages and cracks due to passenger abuse or misuse. At a cost of several hundred dollars per handset, such replacement cost is quite high, not to mention field repair cost and down-time during flight.

Thinking in terms of bottom line, airlines would like to prevent damages based on improper stowage, without comprising the look and feel. On the other hand, airlines cannot afford to replace all the handsets and cradles already in the tens of thousands of installed units. Further, any replace or retrofit efforts must be straightforward enough for the field team to do. As such, efforts involving replacing parts of the handsets by cutting the cable will not work, since cables will now have to be re-terminated and connected.

Therefore, it is desirable to be able to make the handset anti-reversal without having to change the major components or modify existing general design and fit between the handset the cradle.

It is also desirable to retrofit the handsets such that they are incapable of being stowed upside down, without having to uninstall the cradle from the seat arm. The improvement should be readily achievable by the field team.

It is further desirable to be able to replace the handsets, or separate the cable from the handset, without having to re-terminate the cable's connector, which is too costly a process, in time and money, for the field repair efforts.

SUMMARY OF THE INVENTION

An anti-reversal end cap with tab to prevent improper stowage of a handset into its cradle is disclosed. The end cap is formed by joining two members together to route a cable from an in-flight entertainment system to the handset. The end cap has a protruding tab which interferes with the cradle if the handset is positioned to be improperly stowed by the user. The end cap can be taken apart to free the cable from the handset such that the cable does not need to be re-terminated. The tab on the end cap has a generally wedged shape to prevent binding with the cradle and to ensure smooth ejection.

Another aspect of the invention is an end cap to ensure proper stowage orientation of a handset in a cradle installed at an airline passenger's seat. The end cap comprises a tab located and protruding at a predetermined position on the end cap, in such a way that the tab fits through an opening on the cradle only when the handset is stowed properly. The tab interferes with the opening on the cradle to prevent said handset from being fully placed inside the cradle when the handset is placed in the cradle at an improper orientation.

BRIEF DESCRIPTION OF THE DRAWINGS

Additional objects, features and advantages of the present invention will become apparent from the following disclosure, wherein:

FIG. 1 shows an example of a conventional controller handset.

FIG. 2 shows handset 20, with its telephone side up, in accordance with the present invention partially in the cradle 200.

FIG. 3 shows another view of handset 30 being improperly stowed in cradle 300.

FIG. 4 shows handset with its anti-reversal tab 440 and end cap 430.

FIGS. 7(a), 7(b), 8(a) and 8(b) show isometric views and cross-sectional views of the bottom half 620 and top half 610 are shown, respectively.

DETAILED DESCRIPTION OF THE PREFERRED EMBODIMENT

Figure 5:
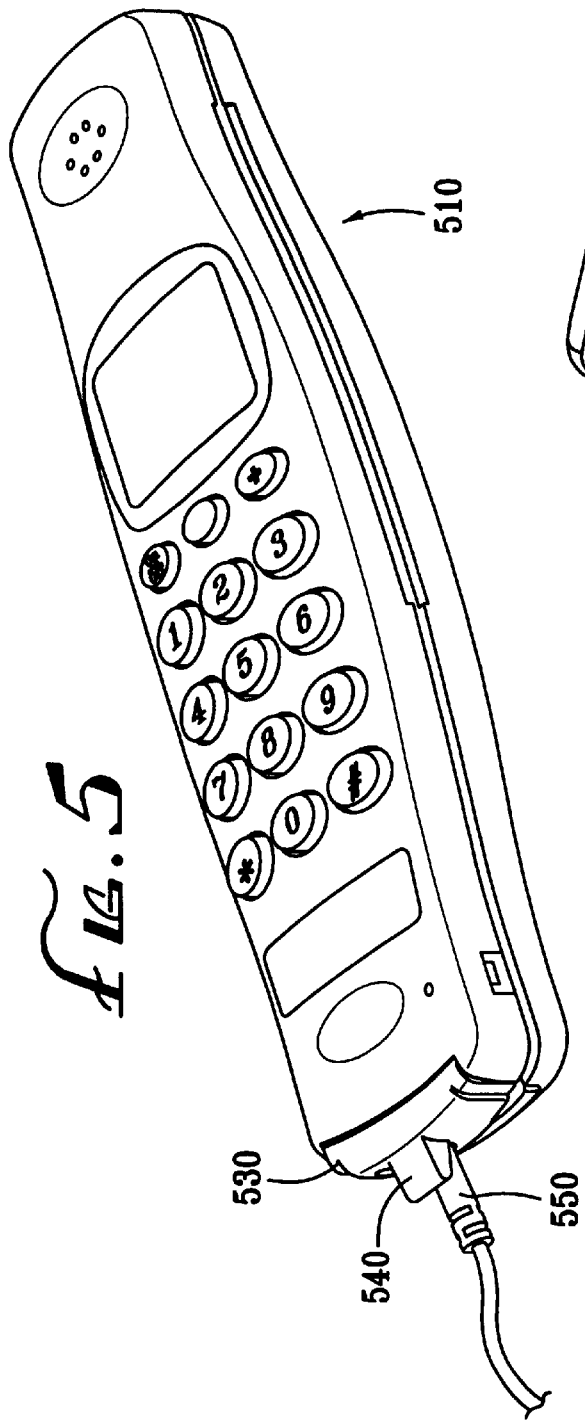
FIG. 5 shows handset 510 with its telephone side up.

An anti-reversal end cap for universal handset controller is disclosed. It should be noted that the present invention is described in terms of commonly known components and devices, which are the means generally used by those skilled in the art to communicate with each other. Based on the disclosure that follows, those skilled in the art can readily practice the present invention, without undue experimentation, for their intended purposes.

FIG. 2 shows handset 20 partially in the cradle 200 with its telephone side, i.e. wrong side, up. An end panel 210, known as the "venturi," locates at one end of cradle 200 to protect cable 250 and its cord reel. Venturi 210 has horse-shoe shaped opening (as shown in FIG. 3). An anti-reversal tab 240 implemented on the end cap of handset 20 is shown interfering with venturi 210 in handset's downward motion to prevent further insertion. If handset 20 has its controller side up, anti-reversal tab 240 fits through the opening on venturi 210 easily. Also, when handset's downward movement is blocked by tab 240 hitting the venturi 210, the other end of handset 20 can only lean on the edge 220 of cradle, thus making it impossible that a passenger will continue to shove handset 20 down into cradle 200 even when it has the wrong side up.

FIG. 3 shows another view of handset 30 being improperly stowed in cradle 300. Note that cable 350 passes through an opening on the venturi piece 310. The opening is shaped, currently in a horse-shoe shape, such that the anti-reversal tab can only fit through the opening, when handset 30 is stowed with its proper side up.

FIG. 4 shows handset with its anti-reversal tab 440 and end cap 430. Strain relief 450 surrounding the cable distributes the bending load over a large area when the cable is flexed and bent, which is typical of how a passenger handles the handsets. End cap 430 and anti-reversal tab 430 are made of material such as Lexan 940A, available from GE Plastics, with tab 440 being positioned in parallel with strain relief 450 as cable enters end cap 430. Tab 440 and strain relief 450 work in conjunction with each other to sustain much greater forces of impact or abuse, than would each individually.

FIG. 5 shows handset 510 with its telephone side up. Anti-reversal tab 540 on end cap 530 takes the general shape of a wedge and is positioned above cable's strain relief 550. While the tab-and-end cap assembly in accordance-with the present invention shows tab 540 positioned on top when the telephone side is up, it should be apparent to those skilled in the art that tab 540 can be located elsewhere based on the given design of the handset and cradle. For the cradle and opening shown in FIG. 3, the location and shape of tab 540 is relative to how tab 540 is intended to interfere with the opening, or the absence thereof, on the venturi piece of the cradle.

Figure 6:
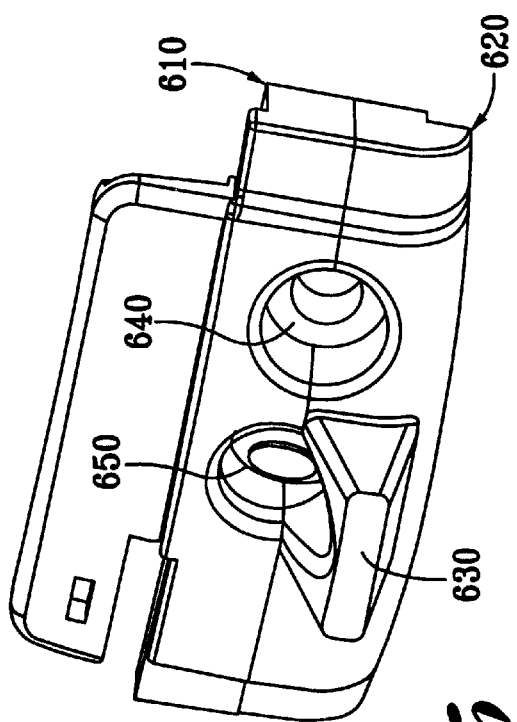
FIG. 6 shows an isometric view of the anti-reversal end cap in accordance with the present invention.
Figure 7A:
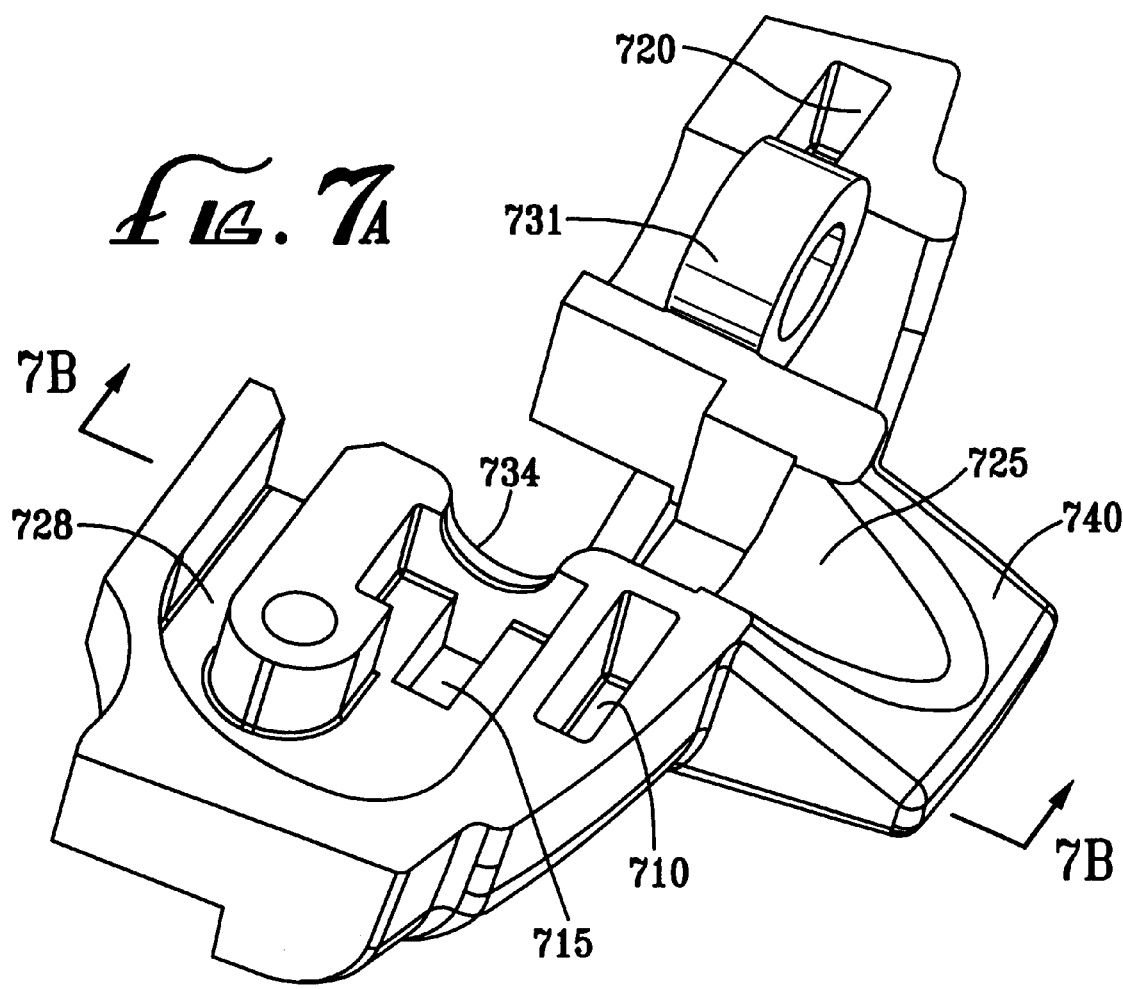
Figure 7B:
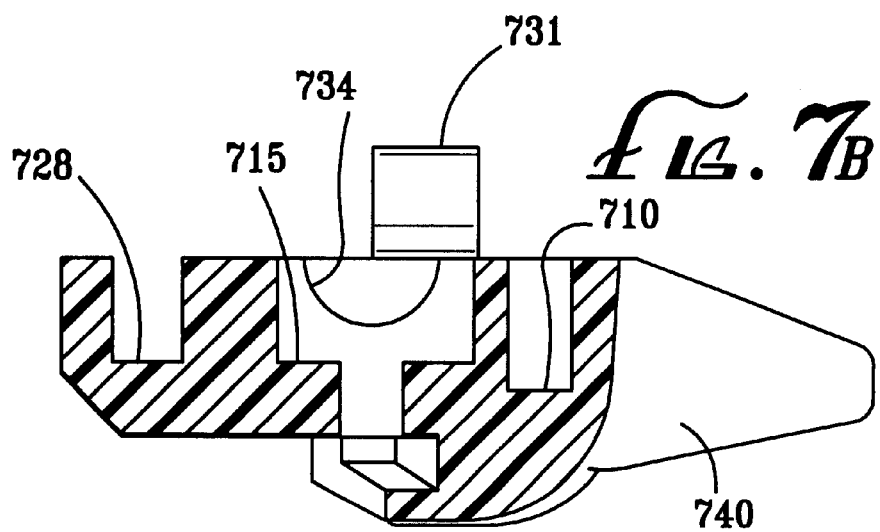

Reference is now turned to FIG. 6, where an isometric view of the anti-reversal end cap in accordance with the present invention is illustrated. Currently, the end cap is made by assembling top half 610 and bottom half 620 into a unitary piece, which can then be installed to the handset. Tab 630 has a general angled and wedged shape, and overlaps the opening 650 for the cable's strain relief. Tab 630 serves to inhibit downward movement of the handset if it is upside down, by interfering with the venturi piece of the cradle. If the handset is stowed correctly, tab 630 smoothly nests in the opening of the venturi piece. As can be appreciated by those skilled in the art, the end cap with tab 630 increases the effective length of the handset if the handset is upside down, while fitting through the opening of the venturi piece if the handset is correctly placed in its cradle.

The angled profile of tab 630 also has the advantage of deflecting any impact away from itself for self-protection, as well as making the handset eject more easily from the cradle. Additionally, opening 650, through which the cable is directed, is preferably positioned in such a way that it overlaps with tab 630. Such overlapping allows both of them, together, to withstand much greater forces of impact and abuse than would each individually.

Referring to FIGS. 7(a), 7(b), 8(a) and 8(b), isometric views and cross-sectional views of the bottom half 620 and top half 610 are shown, respectively. Passage 725 is positioned to overlap with tab 740, for the reasons described above. Enclosed channel 728, 828, which is formed when both halves are joined, is provided to route the cable with a lock 734, 834, which retains a crimp ring on the cable. As can be appreciated by those skilled in the art of Federal Aviation Administration's IFE requirements, a handset and its cable must withstand a minimum pull-off force, e.g. 20 lb, expected from users. As the cable is directed into the end cap through passage 725, its crimp ring is secured by lock 734, 834 together. The cable then winds its away through enclosed channel 728, 828, and reaches the circuit board inside the handset.

The two halves of the end cap are interlocked and secured to the handset as follows: As in the Lego® blocks, indentations 710 and 720 are formed as a female-type lock, while their counterparts male-type 840 and 830 are correspondingly positioned on the upper half of the hand cap. When the two halves are joined together like Lego® blocks, ring-shaped locks 731, 831 allow a screw, e.g. temper-proof screw, through to fasten both halves to the handset at the same time. It should be pointed out that in order to optimize field repair efforts, the passage 725 and enclosed channels 728, 828 are only formed when the two halves are joined together. In other words, when the two halves are separated, the passage 725 is laid open and the cable can be readily removed from the end cap, with the cable's connector intact. This can all be done without having to re-terminate the cable's electrical connectors.

As can be appreciated by those skilled in the art, an end cap may comprise of only one piece to still satisfy both the anti-reversal and ease of field repair requirements, if the limitations of the current handset design are varied slightly. For example, instead of forming passage 725 with two halves of the end cap, it may be constructed such that a portion of passage 725 is pre-formed by the handset's case itself, with the end cap closing to form the complete passage 725. When the end cap is subsequently removed, the passage opens up and the cable can be removed. Also, the dimension, location, angle and shape of the protruding tab may be modified based on the shape and location of the opening on the venturi piece, if called for by the design of the handset and the cradle.

As disclosed, the present invention may be embodied in other specific forms without departing from the spirit or essential characteristics thereof. The present embodiments are to be considered in all respects as illustrative, and not restrictive. The scope of the invention is therefore, indicated by the appended claims rather than by the foregoing description, and all changes which come within the meaning and range of equivalency of the claims are to be embraced within their scope.

What is claimed is:

1. A passenger control handset combination for communication with an on-board electronic system, said combination comprising:

a handset to be used by a passenger to communicate with said on-board electronic system, said handset comprising at least one protruding at a pre-dertermined position;

a cable coupling said handset and said on-board electronic system;

a cradle to stow said handset, said cradle comprising a venturi for receiving the tab wherein said tab is positioned to interfere with said venturi to prevent said handset from being pushed fully into said cradle if said handset is at an improper orientation.

2. The combination of claim 1, wherein said tab protrudes at a predetermined angle such that it does not bind said cradle during removal and during stowage.

3. An end cap to ensure proper stowage orientation of a handset in a cradle installed at an airline passenger's seat, said handset being electrically connected to an on-board electronics system through a cable, said cable connecting between said handset and said electronics system through a passage on said cradle at one end and through said end cap at another end, said end cap comprising:

a tab, said tab being located and protruding at a predetermined position on said end cap, in such a way that said tab fits in said passage on said cradle only when said handset is stowed into said cradle in said proper orientation said tab interfering with said passage on said cradle to prevent said handset from being fully placed inside said cradle when said handset is placed in said cradle at an improper orientation.

4. The end cap of claim 3, wherein said tab has a predetermined dimension and shape such that it does not bind said handset to said cradle.

5. The end cap of claim 3, wherein said tab is placed alongside a portion of said cable as said portion enters said end cap.

6. The end cap of claim 5, wherein said tab has a predetermined width such that said tab does not interfere with said cradle when said handset is stowed into and removed from said cradle.

7. The end cap of claim 3, wherein said end cap is constructed by releasably assembling a plurality of members together, said members being formed in such a way to define an enclosed channel having entry and exit points within said end cap when joined together, said enclosed channel routing said cable within said end cap to provide stress relief on said cable.

8. The end cap of claim 7, wherein said entry and exit points are formed by joining said plurality of members such that said cable is removable from said handset by disassembling said plurality of members without having to re-terminate said cable.

9. A unitary end cap to align stowage of handset in a cradle installed on an airline passenger's seat and to provide ready disassembly, said handset being connected to an on-board electronics system through a cable terminating between said handset and said electronics system, said cable passing through a passage on said cradle and through a opening on said end cap, said end cap comprising:

tab means on said end cap, said tab means being keyed to fit in said passage on said cradle only when said handset is properly stowed into said cradle;

a plurality of members being releasably assembled together to form said unitary end cap, each of said members being formed in a complimentary way to jointly define an enclosed channel having points of entry and exit on said end cap when said members are joined together, said channel routing said cable within said end cap to provide stress relief on said cable, said entry and exit points being formed by joining said plurality of members such that said cable becomes removable from said handset by disassembling said plurality of members without having to re-terminate said cable.

10. The end cap of claim 9, wherein said tab means comprises a generally wedge-shaped protrusion out from said end cap along side said cable.

11. The end cap of claim 9, wherein said plurality of members comprises a upper half and lower half members.

12. The end cap of claim 10, wherein said plurality of members comprises a upper half and lower half members.

* * * * *